(12) United States Patent
Kogure et al.

(10) Patent No.: US 6,578,836 B2
(45) Date of Patent: Jun. 17, 2003

(54) SHOCK ABSORBER FOR AUTOMOBILE

(75) Inventors: Tomohiko Kogure, Hiratsuka (JP); Tatsuo Suzuki, Hiratsuka (JP); Shinji Seimiya, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/002,142

(22) Filed: Dec. 5, 2001

(65) Prior Publication Data
US 2002/0074702 A1 Jun. 20, 2002

(30) Foreign Application Priority Data
Dec. 14, 2000 (JP) .......................... 2000-379945

(51) Int. Cl.$^7$ .............................. F16F 3/08; F16M 13/00
(52) U.S. Cl. ...................... 267/152; 267/153; 267/136; 267/140.4
(58) Field of Search ................................ 267/103, 136, 267/141, 141.2, 151, 152, 153, 143, 174, 175, 178, 166, 170, 140.3, 140.4

(56) References Cited

U.S. PATENT DOCUMENTS 3,562,089 A * 2/1971 Warnaka et al. ............ 428/217
4,623,586 A * 11/1986 Umeya et al. ............... 428/324
4,848,757 A * 7/1989 De Fazio ..................... 267/150
5,351,940 A * 10/1994 Yano et al. .................. 267/153
5,695,867 A * 12/1997 Saitoh et al. ................ 428/219

FOREIGN PATENT DOCUMENTS

DE         26 02 642 A1 *  7/1977
EP         0 663 542 A1 *  7/1995
JP         61290244 A  * 12/1986 .................. 267/33

OTHER PUBLICATIONS

Eugene A Avallone et al., Marks' Standard Handbook for Mechanical Engineers, 1996, McGraw Hill, 10$^{th}$ edition, p. 3–24.*

* cited by examiner

Primary Examiner—Jack Lavinder
Assistant Examiner—Thomas J. Williams
(74) Attorney, Agent, or Firm—Rader, Fishman & Grauer PLLC

(57) ABSTRACT

A shock absorber for an automobile which exhibits a vibration damping effect in a wide range of a frequency, while suppressing generation of frictional noise. The shock absorber for the automobile has a buffer member interposed between parts. The buffer member has a laminated structure including a plurality of vibration damping layers each having a peak of loss tangent tanδ in a range of a frequency which is different from others and surface layers made of thermoplastic resin.

4 Claims, 1 Drawing Sheet

SHOCK ABSORBER FOR AUTOMOBILE

BACKGROUND OF THE INVENTION

1. Field of the Invention

The present invention relates to a shock absorber for an automobile, more particularly to a shock absorber for an automobile which is designed to exhibit a vibration damping effect in a wide range of a frequency, while suppressing generation of frictional noise.

2. Description of the Related Art

A suspension spring of an automobile, especially, a coil spring is liable to generate resonance with other parts, since natural vibration determined by a configuration frequently appears in integer multiples of a fundamental frequency. Further, the coil spring has a problem of generating large frictional noise between spring seats and the coil spring. Thus, if materials which have a low friction coefficient and excellent vibration damping characteristics throughout a wide range of a frequency are arranged between the coil spring and the spring seats, the above-described inconveniences can be solved at the same time. Therefore, it has been desired to develop the above-described material.

SUMMARY OF THE INVENTION

An object of the present invention is to provide a shock absorber for an automobile which can exhibit a vibration damping effect in a wide range of a frequency, while suppressing generation of frictional noise.

In order to achieve the above described object, the shock absorber for the automobile according to the present invention includes a buffer member interposed between parts. The buffer member has a laminated structure including a plurality of vibration damping layers each having a peak of loss tangent tanδ in a range of a frequency which is different from others and surface layers made of thermoplastic resin.

Since a plurality of vibration damping layers having damping characteristics in a range of a frequency which is different from others are stacked as mentioned above, the vibration damping effect can be exhibited in a wide range of a frequency. Further, since the surface layers are made of the thermoplastic resin having a small friction coefficient, noise due to friction can be reduced.

In the present invention, each layer of the vibration damping layers can be made of either of a rubber composition and a composite material including a rubber composition and a thermoplastic resin. The peaks of loss tangent tanδ can be set to various ranges of frequencies different from one another depending on materials of the vibration damping layers.

The present invention is especially preferably applied to the shock absorber for the automobile having buffer members interposed between the coil spring and the spring seats. Since the natural vibration determined by a configuration frequently appears in integer multiples of a fundamental frequency in the coil spring, a plurality of the vibration damping layers, each of which has a peak of loss tangent tanδ in a range of a frequency corresponding to integer multiples of the fundamental frequency, are selected and these plural vibration damping layers are stacked so that the resonance between the coil spring and other parts can be effectively prevented.

DETAILED DESCRIPTION OF THE PREFERRED EMBODIMENT

Referring to accompanying drawings, a constitution of the present invention will be described below in detail.

Figure 1:
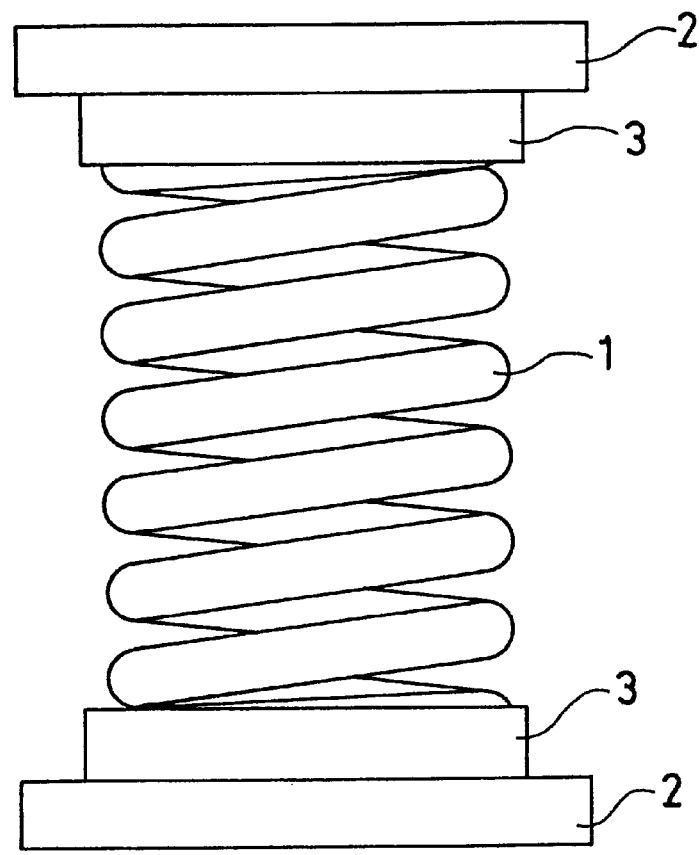
FIG. 1 is a front view showing a shock absorber for an automobile according to an embodiment of the present invention.
Figure 2:
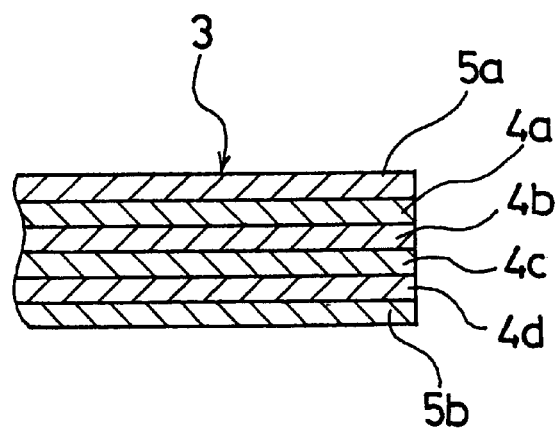
FIG. 2 is an enlarged sectional view of a buffer member in the shock absorber for the automobile shown in FIG. 1.

FIG. 1 shows an example of a shock absorber for an automobile according to the present invention. The shock absorber for the automobile has buffer members 3 interposed between a coil spring 1 and spring seats 2. The buffer member 3 has a laminated structure which includes a plurality of vibration damping layers 4a, 4b, 4c and 4d and surface layers 5a and 5b for sandwiching these vibration damping layers 4a to 4d from both sides thereof, as shown in FIG. 2.

The vibration damping layers 4a to 4d are composed of a simple substance of a rubber composition or a composite material of a rubber composition and a thermoplastic resin, and each of the layers has a peak of the loss tangent tanδ in a range of a frequency which is different from others. The peak values of the loss tangent tanδ and measuring temperature are not specially limited. However, at least the peaks of the loss tangent tanδ measured under the same temperature condition may be dispersed in a range of a frequency which is different from others. The loss tangent tanδ may be measured under the conditions of a temperature of 60° C., an initial distortion of 10% and amplitude of ±2% by using, for example, a dynamic viscoelasticity measuring device (produced by Toyo Seiki Seisaku-Sho, Ltd.).

As mentioned above, the plurality of vibration damping layers 4a to 4d each having damping characteristics in the range of the frequency which is different from others are laminated to exhibit a vibration damping effect in a wide range of a frequency. Therefore, even when the natural vibration of the coil spring 1 has many peaks throughout the wide range of the frequency, a vibration thereof can be effectively damped and resonance thereof with other parts can be effectively prevented. Although the four vibration damping layers are employed in this embodiment, the number of the layers is not specially limited and may be arbitrarily set by considering the range of the frequency of the vibration to be damped.

On the other hand, the surface layers 5a and 5b are made of thermoplastic resin. Friction coefficients of these surface layers 5a and 5b are desirably 0.3 or smaller. As described above, since the surface layers 5a and 5b are composed of the thermoplastic resin having a low friction coefficient, noise due to friction can be reduced. Consequently, the damping characteristics of the rubber composition or the composite material of the rubber composition and the thermoplastic resin can be effectively utilized. In other words, if the rubber composition or the composite material of the rubber composition and the thermoplastic resin is exposed to the contact surface with the coil spring 1, the frictional noise will be generated.

In the present invention, as rubber components used for the rubber composition, followings are enumerated: for example, diene type rubber and hydrogenated forms thereof such as NR, IR, epoxidated natural rubber, SBR, BR (high cis BR and low cis BR), acrylonitrile-butadiene rubber (NBR), hydrogenated NBR, hydrogenated SBR; olefin type rubber such as ethylenepropylene rubber (EPDM, EPM), maleic acid modified ethylenepropylene rubber (M-EPM), butyl rubber (IIR), a copolymer of isobutylene and aromatic vinyl or diene type monomer, acrylic rubber (ACM); halogen containing rubber such as Br-IIR, Cl-IIR, bromide of a isobutylene paramethyl styrene copolymer (Br-IPMS), chloroprene rubber (CR), hydrine rubber (CHR), chlorosulfonated polyethylene (CSM), chlorinated polyethylene (CM), maleic acid modified chlorinated polyethylene (M-CM); silicone rubber such as methylvinyl silicone rubber, dimethyl silicone rubber, methylphenyl vinyl silicone rubber; sulfur containing rubber such as polysulfide rubber; fluorine rubber such as vinylidene fluoride type rubber, fluorine containing vinyl ether type rubber, tetrafluoroethylene-propylene type rubber, fluorine containing silicone type rubber, fluorine containing phosphazene type rubber; urethane rubber, epichlorohydrin rubber, and the like. These rubber compositions may be composed of only one kind or a mixture of two or more kinds of these components. Further, an ordinary vulcanizing agent or a cross-linking agent, a vulcanization accelerator or a cross-linking accelerator, various kinds of oil, an antioxidant, a filler, a softener and various types of other compounding agents generally mixed in the rubber can be mixed with the rubber composition.

As the thermoplastic resin, followings are enumerated: for example, polyolefin type resin, polyamide type resin, polyester type resin, polyether type resin, polynitrile type resin, polymethacrylate type resin, polyvinyl type resin, cellulose type resin, fluorine type resin, imide type resin, and the like.

As specific examples of the polyolefin type resin, followings are enumerated: isotactic polypropylene, syndiotactic polypropylene, ethylenepropylene copolymer resin, and the like.

As specific examples of the polyamide resin, followings are enumerated: Nylon 6 (N6), Nylon 66 (N66), Nylon 46 (N46), Nylon 11 (N11), Nylon 12 (N12), Nylon 610 (N610), Nylon 612 (N612), Nylon 6/66 Copolymer (N6/66), Nylon 6/66/610 Copolymer (N6/66/610), Nylon MXD 6 (MXD 6), Nylon 6T, Nylon 6/6T Copolymer, Nylon 66/PP Copolymer, Nylon 66/PPS Copolymer, a polyamide elastomer, and the like.

As specific examples of the polyester resin, followings are enumerated: aromatic polyesters such as polybutylene terephthalate (PBT), polyethylene terephthalate (PET), polyethylene isophthalate(PEI), a polyester elastomer, a PET/PEI copolymer, polyarylate (PAR), polybutylene naphthalate (PBN), liquid crystal polyester, a polyoxy-alkylene diimide dioic acid/polybutylene terephthalate copolymer, and the like.

As specific examples of the polyether resin, followings are enumerated: polyacetal (POM), polyphenylene oxide (PPO), polysulfone (PSF), polyether ether ketone (PEEK), and the like.

As specific examples of the polynitrile resin, followings are enumerated: polyacrylonitrile (PAN), polymethacrylonitrile, an acrylonitrile/styrene copolymer (AS), a methacrylonitrile/styrene copolymer, a methacrylonitrile/styrene/butadiene copolymer, and the like. As specific examples of the polymethacrylate resin, followings are enumerated: polymethyl methacrylate (PMMA), polyethyl methacrylate, and the like.

As specific examples of the polyvinyl resin, followings are enumerated: vinyl acetate (EVA), polyvinyl alcohol (PVA), a vinyl alcohol/ethylene copolymer (EVOH), polyvinylidene chloride (PVDC), polyvinyl chloride (PVC), a vinyl chloride/vinylidene chloride copolymer, a vinylidene chloride/methyl acrylate copolymer, and the like. As specific examples of the cellulose resin, followings are enumerated: cellulose acetate, cellulose acetate butyrate, and the like.

As specific examples of the fluorine resin, followings are enumerated: polyvinylidene fluoride (PVDF), polyvinyl fluoride (PVF), polychlorofluoroethylene (PCTFE), tetrafluoroethylene/ethylene copolymer (ETFE), and the like. As specific examples of the imide resin, aromatic polyimide (PI) and the like are enumerated.

The composite material of the above rubber composition and the above thermoplastic resin preferably forms a sea-island structure in which one of the rubber composition and the thermoplastic resin constitutes a continuous phase and the other constitutes a dispersed phase. Especially, the sea-island structure in which the dispersed phases of the rubber composition are finely dispersed in the continuous phase of the thermoplastic resin is most preferable. When the rubber composition and the thermoplastic resin form the sea-island structure as described above, the vibration damping layers can be firmly bonded to the surface layers made of the thermoplastic resin. Besides, since the continuous phase is made of the thermoplastic resin, the friction coefficient thereof is lowered so that the continuous phase made of the thermoplastic resin can be directly used as the surface layers which come into contact with the coil spring or the spring seats. Therefore, at least the vibration damping layers adjacent to the surface layers made of the thermoplastic resin are preferably composed of the composite material having the sea-island structure in which the dispersed phases of the rubber composition are finely dispersed in the continuous phase of the thermoplastic resin.

According to the present invention, in the shock absorber for the automobile provided with the buffer members between parts, since each of the buffer members has the laminated structure including the plurality of vibration damping layers each having the peak of loss tangent tanδ in the range of the frequency which is different from others and the surface layers made of the thermoplastic resin, the vibration damping effect can be exhibited in the wide range of the frequency by the plurality of the vibration damping layers, while suppressing generation of frictional noise by the surface layers made of the thermoplastic resin having a small friction coefficient.

Therefore, if the present invention is applied to the shock absorber for the automobile having the buffer members interposed between the coil spring and the spring seats, the resonance between the coil spring and other parts can be effectively prevented.

Although the preferred embodiment of the present invention is specifically described above, it is to be understood that the various modifications, substitutions and replacements can be performed without departing the spirit and scope of the present invention defined by the attached claims.

What is claimed is:

1. A shock absorber for an automobile, comprising:
   a buffer member interposed between parts, wherein said buffer member has a laminated structure including a pair of surface layers made of thermoplastic resin and a plurality of vibration damping layers disposed between the pair of surface layers, each vibration damping layer having a peak of loss tangent tanδ in a frequency range different from remaining ones of the plurality of vibration damping layers, wherein said parts are a coil spring and a spring seat and an integer multiple of a fundamental frequency of natural vibration frequencies of the coil spring lies in the frequency range in which said peak of loss tangent tanδ of each vibration damping layer appears.

2. The shock absorber for the automobile according to claim 1, wherein each layer of said vibration damping layers is composed of one of a rubber composition and a composite material of a rubber composition and a thermoplastic resin.

3. The shock absorber for the automobile according to claim 2, wherein said composite material has a sea-island structure in which one of the rubber composition and the thermoplastic resin forms a continuous phase and the other forms a dispersed phase.

4. The shock absorber for the automobile according to claim 1, wherein friction coefficients of said surface layers are 0.3 or smaller.

* * * * *